United States Patent
Donovan

(10) Patent No.: US 9,384,410 B2
(45) Date of Patent: Jul. 5, 2016

(54) METHOD AND SYSTEM FOR IMAGE COMPRESSION WHILE ENCODING AT LEAST ONE EXTRA BIT

(71) Applicant: NVIDIA Corporation, Santa Clara, CA (US)

(72) Inventor: Walter E. Donovan, Saratoga, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 47 days.

(21) Appl. No.: 13/728,175

(22) Filed: Dec. 27, 2012

(65) Prior Publication Data

US 2013/0308871 A1 Nov. 21, 2013

Related U.S. Application Data

(60) Provisional application No. 61/649,829, filed on May 21, 2012.

(51) Int. Cl.
*G06K 9/00* (2006.01)
*G06K 9/36* (2006.01)
*G06T 9/00* (2006.01)
*H04N 19/46* (2014.01)
*H04N 19/94* (2014.01)

(52) U.S. Cl.
CPC . *G06K 9/36* (2013.01); *G06T 9/008* (2013.01); *H04N 19/46* (2014.11); *H04N 19/94* (2014.11)

(58) Field of Classification Search
None
See application file for complete search history.

(56) References Cited

U.S. PATENT DOCUMENTS

| | | | |
|---|---|---|---|
| 5,719,632 A * | 2/1998 | Hoang et al. | 375/240.05 |
| 5,734,744 A | 3/1998 | Wittenstein et al. | |
| 5,790,705 A | 8/1998 | Anderson et al. | |
| 6,026,180 A | 2/2000 | Wittenstein et al. | |
| 6,181,822 B1 | 1/2001 | Miller et al. | |
| 6,326,964 B1 * | 12/2001 | Snyder et al. | 345/419 |
| 6,356,588 B1 | 3/2002 | Otto | |
| 6,518,974 B2 | 2/2003 | Taylor et al. | |
| 7,006,662 B2 | 2/2006 | Alattar et al. | |
| 7,039,241 B1 | 5/2006 | Van Hook | |
| 7,308,146 B2 | 12/2007 | Becker et al. | |
| 7,561,714 B2 | 7/2009 | Tian et al. | |
| 7,565,028 B2 | 7/2009 | Saed | |
| 8,111,928 B2 | 2/2012 | Van Hook et al. | |
| 8,411,942 B2 | 4/2013 | Chen et al. | |
| 8,942,474 B2 | 1/2015 | Werness et al. | |
| 9,147,264 B2 | 9/2015 | Donovan et al. | |
| 2002/0061063 A1 | 5/2002 | Otto | |

(Continued)

OTHER PUBLICATIONS

Huang, "Ternary Embedding", created Dec. 9, 2011, available at https://www.google.com/search?q=https%3A%2F% 2Fweb.njit. edu%2F~shi%2FGourses%2FECE643%2FTernary%2520Embedding%2520_Xiaoyu%2520Huang_ChenChen.pptx.

(Continued)

*Primary Examiner* — Hadi Akhavannik

(57) ABSTRACT

A method for encoding at least one extra bit in an image compression and decompression system. The method includes accessing an input image, and compressing the input image into a compressed image using an encoder system, wherein said encoding system implements an algorithm for encoding at least one extra bit. The method further includes communicatively transferring the compressed image to a decoding system, and decompressing the compressed image into a resulting uncompressed image that is unaltered from said input image, wherein the algorithm for encoding enables the recovery of the at least one extra bit.

19 Claims, 8 Drawing Sheets

(56) References Cited

U.S. PATENT DOCUMENTS

| | | |
|---|---|---|
| 2003/0043905 A1* | 3/2003 | Nakayama et al. ...... 375/240.04 |
| 2004/0001611 A1 | 1/2004 | Celik et al. |
| 2004/0105015 A1 | 6/2004 | Tsukioka |
| 2004/0146205 A1* | 7/2004 | Becker et al. .................. 382/232 |
| 2005/0055554 A1 | 3/2005 | Sion et al. |
| 2005/0152610 A1 | 7/2005 | Hagiwara et al. |
| 2006/0215923 A1 | 9/2006 | Beatty |
| 2007/0292034 A1 | 12/2007 | Tabankin |
| 2008/0199093 A1 | 8/2008 | Shi et al. |
| 2008/0247002 A1 | 10/2008 | Au et al. |
| 2009/0116685 A1 | 5/2009 | Yoo et al. |
| 2009/0257485 A1* | 10/2009 | Youn ........................ 375/240.01 |
| 2010/0219991 A1* | 9/2010 | Tang .............................. 341/55 |
| 2011/0170609 A1 | 7/2011 | Lainema et al. |
| 2011/0194616 A1 | 8/2011 | He et al. |
| 2011/0242113 A1 | 10/2011 | Keall et al. |
| 2011/0292247 A1* | 12/2011 | Gharavi-Alkhansari et al. ........................ 348/231.99 |
| 2012/0050563 A1 | 3/2012 | Cote et al. |
| 2012/0121013 A1 | 5/2012 | Lainema et al. |
| 2012/0213435 A1 | 8/2012 | Donovan et al. |
| 2014/0009576 A1 | 1/2014 | Hadzic et al. |
| 2014/0184632 A1 | 7/2014 | Donovan |
| 2015/0146993 A1 | 5/2015 | Donovan et al. |
| 2016/0063676 A1 | 3/2016 | Donovan |

OTHER PUBLICATIONS

Celik et al., "Reversable Data Hiding", published 2002, IEEE.

* cited by examiner

Encoding Algorithm     100

```
static int truth = 0xD4;   // for example (truth is 9 bits in size)
static int n = 8;          // or however many bits x and y have static int F(unsigned int x, unsigned int y)
{
    int out = truth >> 8;
    for (int i=0; i<n; ++i)
    {
        int xb = (x >> i) & 1;
        int yb = (y >> i) & 1;
        int bitaddr = (out << 2) | (yb << 1) | xb;
        out = (truth >> bitaddr) & 1;
    }
    return out;
}
```

Fig. 1

METHOD AND SYSTEM FOR IMAGE COMPRESSION WHILE ENCODING AT LEAST ONE EXTRA BIT

RELATED US APPLICATION

The present application claims benefit to U.S. provisional patent application Ser. No. 61/649,829, filed on May 21, 2012, entitled "General Hardware Implementation to Encode an Additional Bit Given Two N-bit Values that Can Be Swapped," inventor Walter Donovan, which application is hereby incorporated by reference herein.

FIELD OF THE INVENTION

The present invention is generally related to computer systems.

BACKGROUND OF THE INVENTION

Entropy or lossless encoders include Lempel-Ziv encoders and are used for many different purposes. Discrete Cosine Transform ("DCT") or JPEG-type compressors, allow users to select a level of image quality. With DCT, uncorrelated coefficients are produced so that each coefficient can be treated independently without loss of compression efficiency. The DCT coefficients can be quantized using visually-weighted quantization values which selectively discard the least important information.

DCT, however, suffers from a number of shortcomings. One problem with DCT and JPEG-type compressors is that they require usually bigger blocks of pixels, typically 8.times.8 or 16.times.16 pixels, as a minimally accessible unit in order to obtain a reasonable compression factor and quality. Access to a very small area, or even a single pixel involves fetching a large quantity of compressed data, thus requiring increased processor power and memory bandwidth.

Block truncation coding ("BTC") and color cell compression ("CCC") use a local one-bit quantizer on 4.times.4 pixel blocks. The compressed data for such a block consists of only two colors and 16-bits that indicate which one of the two colors is assigned to each of the 16 pixels. Decoding a BTC/CCC image consists of using a multiplexer with a look-up table so that once a 16-texel-block (32-bits) is retrieved from memory, the individual pixels are decoded by looking up the two possible colors for that block and selecting the color according to the associated bit from the 16 decision bits.

Therefore, there is a need for a method and system that maximizes the accuracy of compressed images while minimizing storage, memory bandwidth requirements, and decoding hardware complexities, while also compressing image data blocks into convenient sizes to maintain alignment for random access to any one or more pixels.

SUMMARY OF THE INVENTION

In one embodiment, the present invention is implemented as a method for encoding at least one extra bit in an image compression and decompression system. The method includes accessing an input image, and compressing the input image into a compressed image using an encoder system, wherein said encoding system implements an algorithm for encoding at least one extra bit. The method further includes communicatively transferring the compressed image to a decoding system, and decompressing the compressed image into a resulting uncompressed image that is unaltered from said input image, wherein the algorithm for encoding enables the recovery of the at least one extra bit.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention is illustrated by way of example, and not by way of limitation, in the figures of the accompanying drawings and in which like reference numerals refer to similar elements.

FIG. 1 shows an algorithm illustrating the general form of an algorithm in accordance with one embodiment of the present invention.

DETAILED DESCRIPTION OF THE INVENTION

Figure 2:
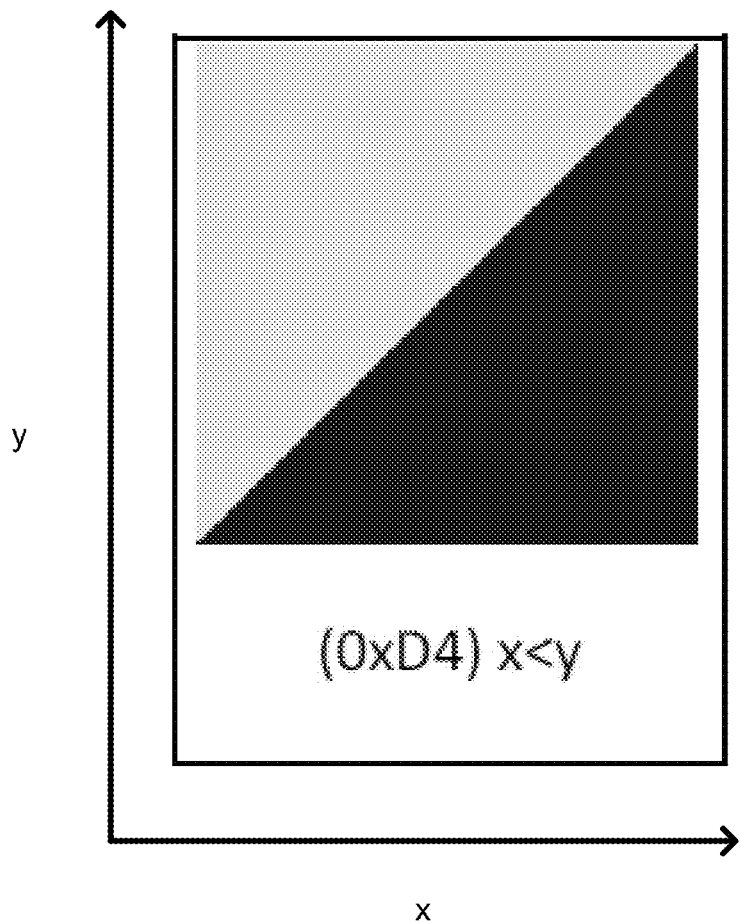
FIG. 2 shows a truth image for the function F(x,y) for n=8 in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of non-transitory electrical or magnetic signals capable of being stored, transferred, combined, compared, and otherwise manipulated in a computer readable storage medium of a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention implement an image encoding function for compressing image data, and through such compressing is able to encode one or more extra bits with the compressed image data such that the resulting decompressed image data is unaltered and the one or more extra bits are recovered by the decoder. In one embodiment, the present invention is implemented as an image processing system includes an image encoder system and an image decoder system that are coupled together.

Embodiments of the present invention include functionality whereby the encoding format can be changed without altering the outcome of the decompressed image. The manner in which the encoding format is changed allows the encoding of at least one extra bit. The at least one extra bit enables an increase in precision in the encoding format.

In this manner, embodiments of the present invention can take advantage of the bit ordering in x and y in order to encode at least one extra bit. The extra bits can be used for a number of different applications in addition to increasing precision. The extra bits are gained at very little extra cost with respect to system hardware. The extra bits are extracted during the decoding process by the decoder. For tile-based image rendering implementations, for each tile, at least one extra bit can be obtained.

It should be noted that the term "image" as used herein comprises a multi-dimensional array of numbers that can represent an image, a function, a normal map, or any other collection of data.

In one embodiment, in the cases where we have two n-bit (unsigned) values (say, x and y) that can be swapped arbitrarily, we can encode an extra bit of information by applying a function F to x and y such that:

1. F(x,y) returns 0 or 1.
2. F(x,y)=1−F(y,x) if x !=y.
3. F(x,x) can return either 0 or 1.

One example of such a function is $F(x,y):=(x<y)$.

For example, one way to implement (x<y) is to subtract and look at the sign bit of (y−x). A much more compact implementation is to scan the bit representation from the least to the most significant bit and return a result.

FIG. 1 shows an algorithm 100 illustrating the general form of an algorithm in accordance with one embodiment of the present invention. The algorithm 100 presents an example that shows how each stage takes one bit each from x and y and the output of the previous stage, and passes one bit to the next stage. The value of truth, 0xD4, gives a result identical to $F(x,y):=(x<y)$.

FIG. 2 shows a truth image for the function F(x,y) for n=8 and all x and y in the range 0 . . . 255 (x is the horizontal axis, y the vertical; (x,y)=(0,0) is at the lower left.) Light grey is where F(x,y) is 1 and black is where F(x,y) is 0.

Figure 3:
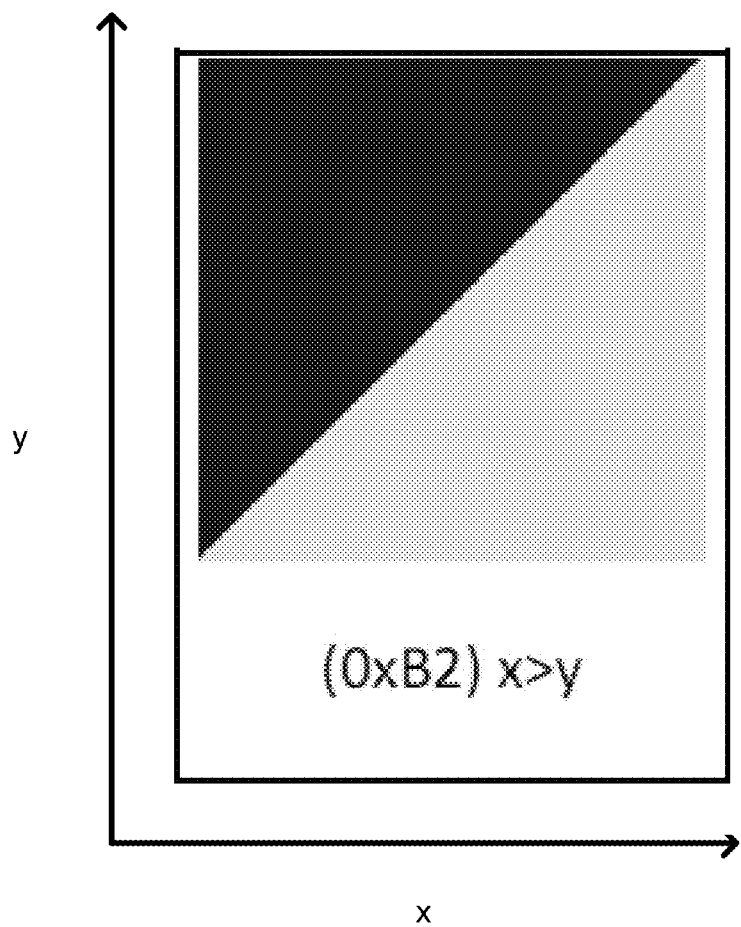
FIG. 3 shows a truth image for a function in accordance with one embodiment of the present invention.
Figure 4:
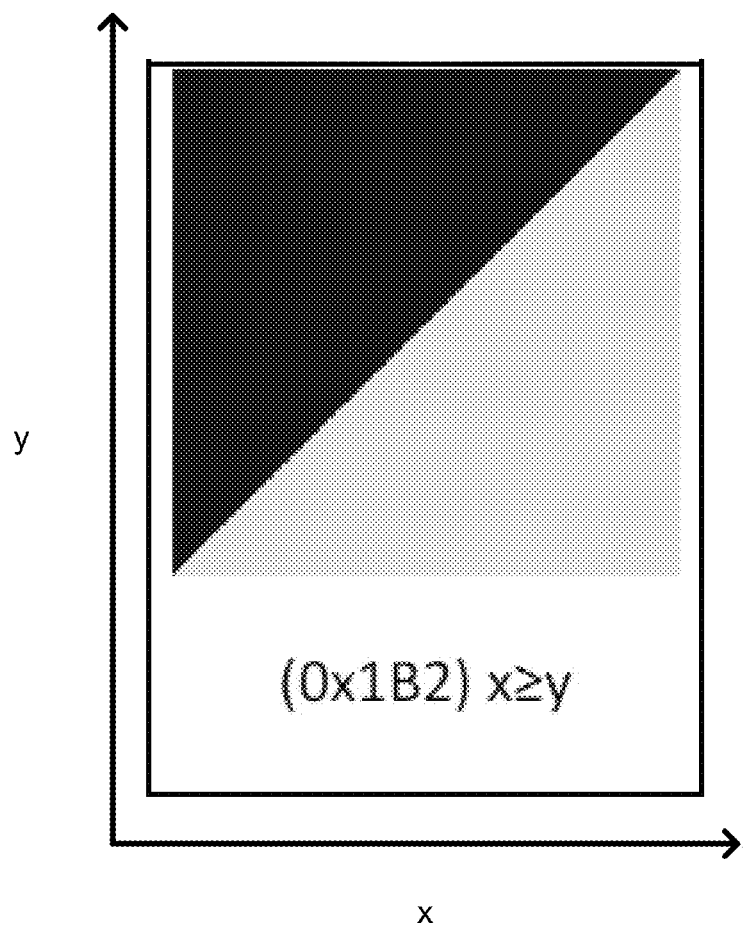
FIG. 4 shows a truth image for a function in accordance with one embodiment of the present invention.
Figure 5:
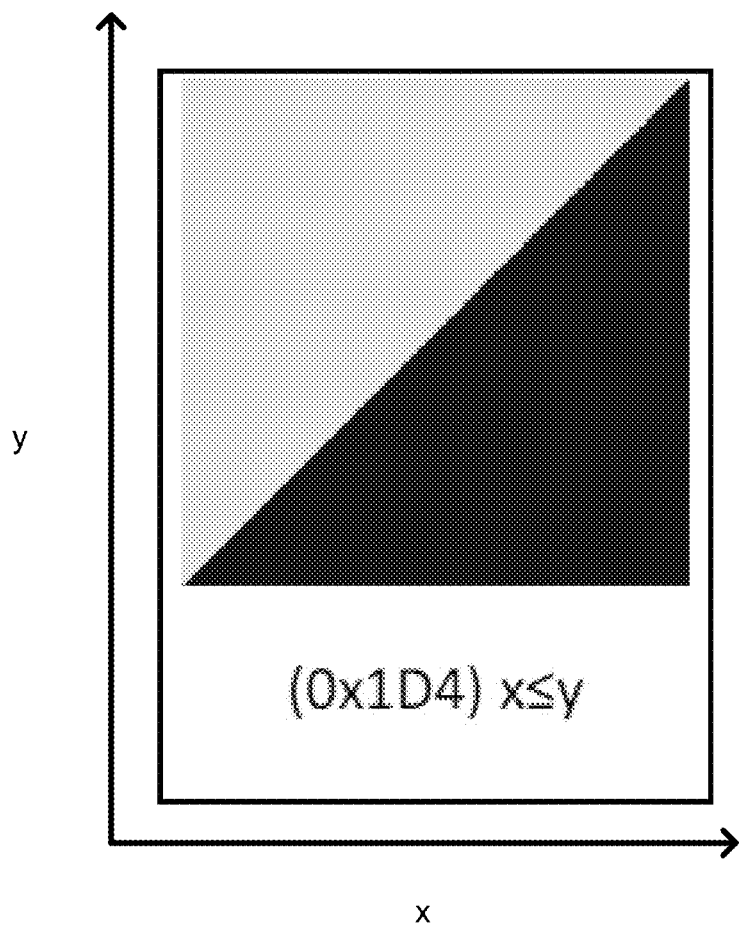
FIG. 5 shows a truth image for a function in accordance with one embodiment of the present invention.

FIG. 3, FIG. 4 and FIG. 5 show three other values for truth and give similar images and implement the indicated function in the labels.

Figure 6:
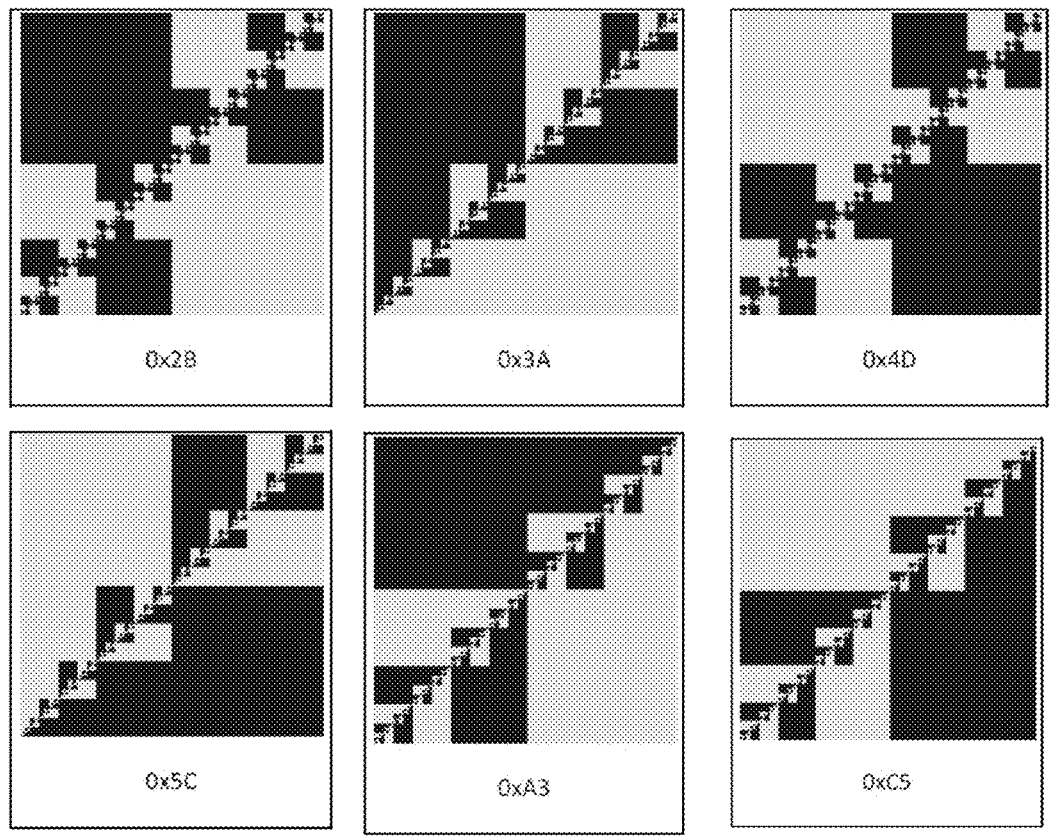
FIG. 6 shows six additional truth images for functions in accordance with one embodiment of the present invention.

FIG. 6 shows six additional exemplary truth images in accordance with one embodiment of the present invention. Surprisingly, there are twelve other functions, however, that exist and satisfy the requirements. The truth tables (e.g., truth images) for six of them are shown in FIG. 6. The other six have the 0x100 bit set in their truth table.

It should also be noted that one can permute the bits of x and y and get other functions that work. For example, G(x,y):=F(permute(x), permute(y)) will also work and give very different truth images. However, arguably that is a small transformation and may not really give a different function, only a different interpretation of the same function. Additionally, it should be noted that the same permutation has to be applied to x and y. None of the twelve new functions above can be changed into an x<y or x>y form via permuting the input; thus, they are truly new and different functions.

Figure 7:
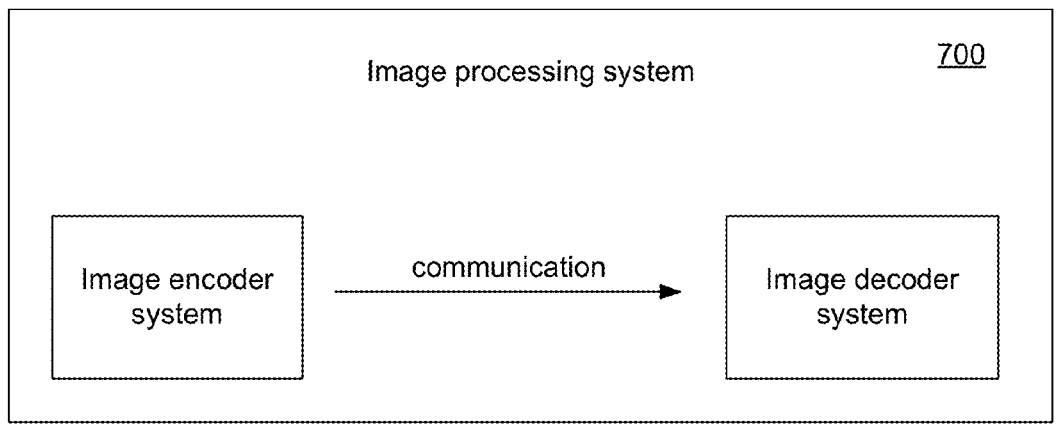
FIG. 7 shows an image processing system in accordance with one embodiment of the present invention.

FIG. 7 shows an image processing system 700 in accordance with one embodiment of the present invention. As described above, the image processing system includes an image encoder system that is communicatively coupled to an image decoder system. Embodiments of the present invention include functionality whereby the encoding format can be changed without altering the outcome of the decompressed image. The manner in which the encoding format is changed allows the encoding of at least one extra bit.

Figure 8:
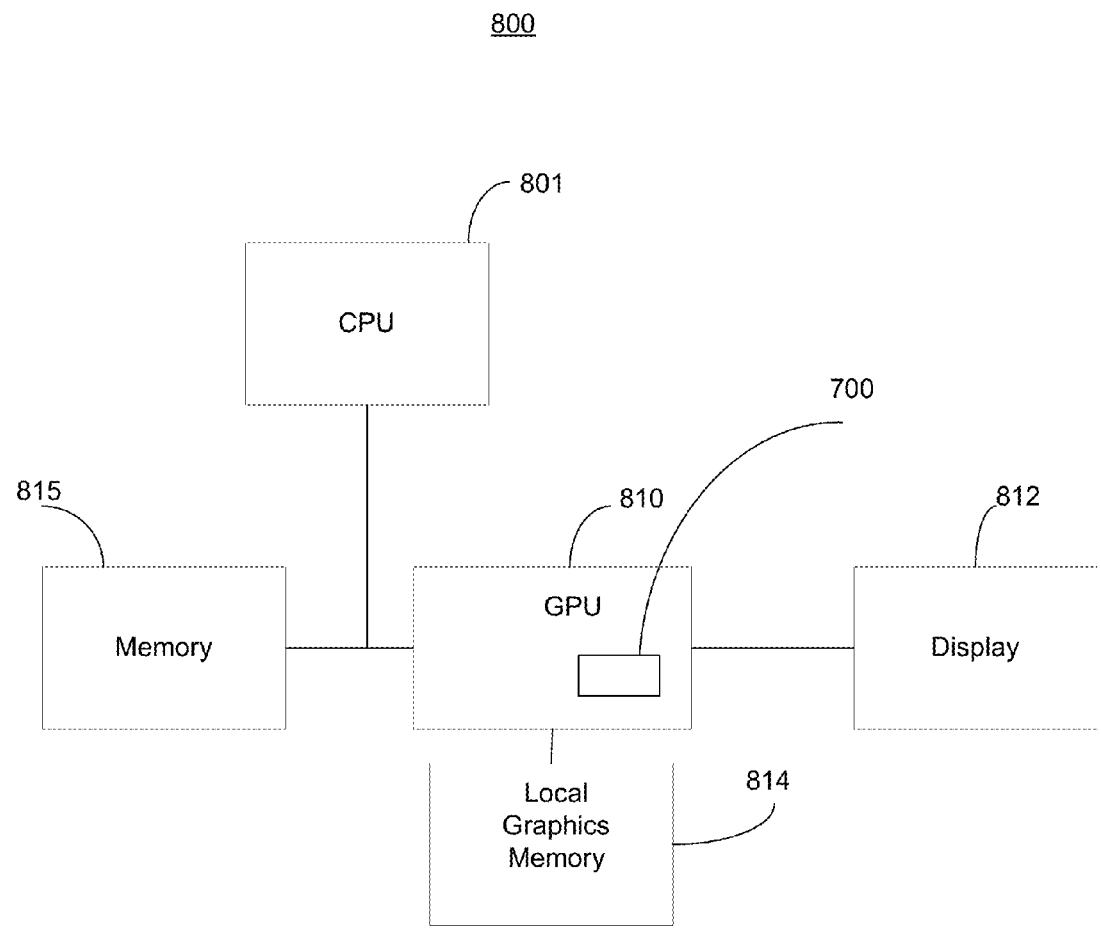
FIG. 8 shows a computer system in accordance with one embodiment of the present invention.

Computer System Platform:

FIG. 8 shows a computer system 800 in accordance with one embodiment of the present invention. Computer system 800 depicts the components of a basic computer system in accordance with embodiments of the present invention providing the execution platform for certain hardware-based and software-based functionality. In general, computer system 800 comprises at least one CPU 801, a system memory 815, and at least one graphics processor unit (GPU) 810. The CPU 801 can be coupled to the system memory 815 via a bridge component/memory controller (not shown) or can be directly coupled to the system memory 815 via a memory controller (not shown) internal to the CPU 801. The GPU 810 is coupled to a display 812. The GPU 810 is shown including image processing system 700. One or more additional GPUs can optionally be coupled to system 800 to further increase its computational power. The GPU(s) 810 is coupled to the CPU 801 and the system memory 815. System 800 can be implemented as, for example, a desktop computer system or server computer system, having a powerful general-purpose CPU 801 coupled to a dedicated graphics rendering GPU 810. In such an embodiment, components can be included that add peripheral buses, specialized graphics memory, IO devices, and the like. Similarly, system 800 can be implemented as a handheld device (e.g., cellphone, etc.) or a set-top video game console device such as, for example, the Xbox®, available from Microsoft Corporation of Redmond, Wash., or the PlayStation3®, available from Sony Computer Entertainment Corporation of Tokyo, Japan.

It should be appreciated that the GPU 810 can be implemented as a discrete component, a discrete graphics card designed to couple to the computer system 800 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, a local graphics memory 814 can be included for the GPU 810 for high bandwidth graphics data storage.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for encoding at least one extra bit in an image compression and decompression system, comprising:
    accessing an input image;
    compressing the input image into a compressed image using an encoder system, wherein said encoding system implements an algorithm for encoding the input image in addition to at least one extra bit, wherein the at least one extra bit is based on a bit ordering of a plurality values associated with the input image;
    communicatively transferring the compressed image to a decoding system; and
    decompressing the compressed image into a resulting uncompressed image that is unaltered from said input image, wherein the algorithm for encoding enables the recovery of the at least one extra bit.

2. The method of claim 1, wherein the image compression and decompression system is a tile-based image compression and decompression system.

3. The method of claim 1, wherein the input image comprises a texture.

4. The method of claim 1, wherein the algorithm implements a scan of the bit representation x and y from the least to the most significant bit, or in any other fixed order, and returns a result therefrom.

5. The method of claim 1, wherein the image compression and decompression system includes a plurality of stages, and wherein each stage takes one bit each from x and y and an output of a previous stage, and passes one bit to a next stage.

6. The method of claim 1, wherein the image compression and decompression system is lossless.

7. A non-transitory computer readable media for encoding at least one extra bit in an image compression and decompression system, which when executed by an image compression and decompression system causes said set image compression and decompression system to implement a method, comprising:
    accessing an input image;
    compressing the input image into a compressed image using an encoder system, wherein said encoding system implements an algorithm for encoding the input image in addition to at least one extra bit, wherein the at least one extra bit is based on a bit ordering of a plurality values associated with the input image;
    communicatively transferring the compressed image to a decoding system; and
    decompressing the compressed image into a resulting uncompressed image that is unaltered from said input image, wherein the algorithm for encoding enables the recovery of the at least one extra bit.

8. The non-transitory computer readable media of claim 7, wherein the image compression and decompression system is a tile-based image compression and decompression system.

9. The non-transitory computer readable media of claim 7, wherein the input image comprises a texture.

10. The non-transitory computer readable media of claim 7, wherein the algorithm implements a scan of the bit representation x and y from the least to the most significant bit and return a result.

11. The non-transitory computer readable media of claim 7, wherein the image compression and decompression system includes a plurality of stages, and wherein each stage takes one bit each from x and y and an output of a previous stage, and passes one bit to a next stage.

12. The non-transitory computer readable media of claim 7, wherein the image compression and decompression system is lossy.

13. A computer system, comprising:
    a computer system having a processor coupled to a computer readable storage media and executing computer readable code which causes the computer system to:
    access an input image;
    compressed the input image into a compressed image using an encoder system, wherein said encoding system implements an algorithm for encoding the input image in addition to at least one extra bit, wherein the at least one extra bit is based on a bit ordering of a plurality values associated with the input image;
    communicatively transfer the compressed image to a decoding system; and
    decompress the compressed image into a resulting uncompressed image that is unaltered from said input image, wherein the algorithm for encoding enables the recovery of the at least one extra bit.

14. The computer system of claim 13, wherein the image compression and decompression system is a tile-based image compression and decompression system.

15. The computer system of claim 13, wherein the input image comprises a texture.

16. The computer system of claim 13, wherein the algorithm implements a scan of the bit representation x and y from the least to the most significant bit and return a result.

17. The computer system of claim 13, wherein the image compression and decompression system includes a plurality of stages, and wherein each stage takes one bit each from x and y and an output of a previous stage, and passes one bit to a next stage.

18. The computer system of claim 13, wherein the image compression and decompression system is lossless or lossy.

19. The computer system of claim 13, wherein the image compression and decompression system implements the functions x<y or x<=y or x>y or x>=y without doing an explicit subtraction.

* * * * *